US012565238B2

(12) United States Patent
Honer et al.

(10) Patent No.: US 12,565,238 B2
(45) Date of Patent: Mar. 3, 2026

(54) SYSTEM AND METHOD FOR AUTONOMOUSLY MOVING A VEHICLE TO SAFETY IN RESPONSE TO DETECTED HAZARDS

(71) Applicants: Kenneth A. Honer, Santa Clara, CA (US); Sarah C. Honer, Santa Clara, CA (US)

(72) Inventors: Kenneth A. Honer, Santa Clara, CA (US); Sarah C. Honer, Santa Clara, CA (US)

( * ) Notice: Subject to any disclaimer, the term of this patent is extended or adjusted under 35 U.S.C. 154(b) by 0 days.

(21) Appl. No.: 19/054,155

(22) Filed: Feb. 14, 2025

(65) Prior Publication Data

US 2025/0256735 A1     Aug. 14, 2025

Related U.S. Application Data

(60) Provisional application No. 63/553,139, filed on Feb. 14, 2024.

(51) Int. Cl.
| | |
|---|---|
| *B60W 60/00* | (2020.01) |
| *B60Q 1/52* | (2006.01) |
| *B60Q 5/00* | (2006.01) |
| *E05F 15/77* | (2015.01) |
| *H04W 4/44* | (2018.01) |
| *H04W 4/90* | (2018.01) |

(52) U.S. Cl.
CPC ........... *B60W 60/0015* (2020.02); *B60Q 1/52* (2013.01); *B60Q 5/005* (2013.01); *E05F 15/77* (2015.01); *H04W 4/44* (2018.02); *H04W 4/90* (2018.02); *B60W 2420/403* (2013.01); *B60W 2555/20* (2020.02); *B60W 2556/45* (2020.02); *B60W 2556/50* (2020.02); *E05Y 2900/106* (2013.01)

(58) Field of Classification Search
CPC ......... B60W 60/0015; B60W 2556/50; B60W 2556/45; B60W 2555/20; B60W 2420/403; E05F 15/77; H04W 4/44; H04W 4/90; B60Q 1/52; B60Q 5/005
See application file for complete search history.

(56) References Cited

U.S. PATENT DOCUMENTS

| | | | |
|---|---|---|---|
| 3,824,422 | A | 7/1974 | Van Der Walt et al. |
| 9,646,356 | B1 | 5/2017 | Schwie et al. |
| 10,254,150 | B2 | 4/2019 | Eskildsen et al. |

(Continued)

OTHER PUBLICATIONS

International Search Report received in counterpart PCT Application No. PCT/US2025/016090 dated May 1, 2025 and consisting of 21 pages.

*Primary Examiner* — Peter D Nolan
*Assistant Examiner* — Wae L Louie
(74) *Attorney, Agent, or Firm* — Bold IP, PLLC; Houda El-Jarrah

(57)     ABSTRACT

A system and method for autonomously relocating a vehicle in response to a detected hazard. Sensor data is received from one or more sensors configured to detect hazardous conditions, and is analyzed to determine whether a hazardous condition exists. A determination is made as to whether any obstructions are present in a predetermined movement path of the vehicle to a predetermined safe location. If a hazardous condition exists and no obstructions are present in the predetermined movement path of the vehicle, a relocation command is issued to the vehicle to move to the predetermined safe location.

19 Claims, 3 Drawing Sheets

(56) References Cited

U.S. PATENT DOCUMENTS

| | | | | |
|---|---|---|---|---|
| 12,300,043 | B1 * | 5/2025 | Schmitt | G06N 20/00 |
| 2019/0202463 | A1 | 7/2019 | Anderson et al. | |
| 2020/0142419 | A1 * | 5/2020 | Pohl | G05D 1/0246 |
| 2020/0342756 | A1 | 10/2020 | Mackenzie | |
| 2021/0031760 | A1 * | 2/2021 | Ostafew | B60W 30/09 |
| 2021/0286651 | A1 * | 9/2021 | Ho | G06F 3/0647 |
| 2022/0126875 | A1 * | 4/2022 | Hammoud | B60W 30/09 |
| 2022/0348097 | A1 | 11/2022 | Garofalo et al. | |
| 2022/0403693 | A1 | 12/2022 | Fitzgibbon et al. | |
| 2022/0404829 | A1 * | 12/2022 | Nister | G05D 1/0214 |
| 2023/0182772 | A1 * | 6/2023 | Funke | B60W 60/0015 |
| | | | | 701/23 |
| 2023/0260403 | A1 * | 8/2023 | Rajanna | G08G 1/166 |
| | | | | 701/301 |
| 2024/0046795 | A1 * | 2/2024 | Boyle | H04W 4/027 |
| 2025/0076058 | A1 * | 3/2025 | Colijn | G01C 21/343 |

* cited by examiner

SYSTEM AND METHOD FOR AUTONOMOUSLY MOVING A VEHICLE TO SAFETY IN RESPONSE TO DETECTED HAZARDS

CROSS-REFERENCE TO RELATED APPLICATIONS

This application claims priority to U.S. provisional application No. 63/553,139, filed on Feb. 14, 2024, which is incorporated herein by reference.

FIELD

This disclosure relates generally to autonomous vehicles and hazard detection systems, and more particularly, relates to a system and method that enables a vehicle to autonomously relocate in response to detected hazards such as fire, flood, earthquake, tsunamis, and other potentially dangerous conditions.

BACKGROUND

Property loss due to natural disasters and other unforeseen emergencies is a major concern for homeowners, with fires, floods, earthquakes, tornados, hurricanes, tsunamis, and other hazardous conditions posing destructive threats to residential dwellings. Fires, in particular, pose a significant danger, and one of the most common places for fires to originate in a home is the garage. Garages often contain multiple sources of combustible materials, including the vehicle itself which represents both a significant financial investment and a potential fire hazard. The growing adoption of electric vehicles (EVs) has introduced additional fire risks. Unlike gasoline-powered vehicles, EVs use high-capacity lithium-ion batteries which, under certain conditions, can catch fire and become extremely difficult to extinguish. Fire personnel face unique challenges when dealing with EV fires, as lithium-ion battery fires can burn at extremely high temperatures, may undergo thermal runaway (a self-sustaining chain reaction that leads to prolonged burning), and often require specialized firefighting techniques to fully extinguish.

Modern residential safety systems incorporate various technologies designed to detect and mitigate emergencies. Fire detection devices such as smoke alarms are mandated in homes and are often interconnected so that activation of one alarm triggers all alarms in the network. Similarly, water leak sensors—such as those sold by Moen, Inc.—can alert homeowners to the presence of unintended water, helping to mitigate flood damage. Additionally, automated warning systems can provide real-time alerts in response to seismic activity, allowing for early warning in the event of an earthquake.

At the same time, advancements in vehicle automation have led to the development and commercialization of self-parking and self-driving technologies, such as for instance Tesla's Autopilot system. These advancements enable vehicles to park, navigate, and maneuver autonomously using an array of sensors, such as ultrasonic sensors, cameras, radar (which uses radio waves to detect objects), LIDAR (which uses lasers to detect objects), and other sensors to detect surrounding objects. Autonomous vehicles can move and relocate themselves when prompted, so long as their intended path is unobstructed.

A system that integrates hazard and emergency detection with autonomous vehicle movement would be advantageous. It would be desirable to have a system wherein, in the event of a fire, flood, earthquake, tsunami, or other hazard or emergency, a vehicle parked inside a garage or other area at risk could automatically relocate itself to a safer location that is remote from the detected hazard. Such a system would help to protect the vehicle from damage, minimize harm to the garage and associated dwelling, and reduce risks to first responders during suppression and rescue efforts.

The inclusion of any information in this background section should not be construed as an admission that such information constitutes prior art. This section may describe aspects of the subject invention and related concepts.

SUMMARY

The following summary relates to one or more aspects or embodiments disclosed herein. It is not intended to provide a comprehensive overview of all contemplated aspects or embodiments, nor should it be construed as identifying key or essential features limiting the scope of any particular aspect or embodiment. Rather, this summary presents certain concepts in a simplified form as a prelude to the detailed description that follows.

This disclosure provides a system and method for automatically relocating a vehicle to a safer location in response to a detected hazard, such as a fire, flood, earthquake, tornado, hurricane, tsunami, or other hazardous condition. The system enables the vehicle to move to the safer location automatically and without manual intervention, thereby mitigating potential damage to the vehicle, the garage or other surrounding structure, and nearby property.

The system of this disclosure may incorporate various hazard detection mechanisms. In some embodiments, the vehicle itself may be equipped with onboard sensors capable of detecting hazardous conditions, such as elevated temperatures, smoke, or water intrusion. In some embodiments, the vehicle may communicate with external sensors located within the garage and/or residential structure, such as smoke detectors, water leak detectors, and other hazard detection devices. Upon receiving an indication of a potential hazard, the system may determine whether vehicle relocation is necessary.

Before initiating movement, the system may perform preparatory actions to ensure safe departure. In embodiments where the vehicle is housed in a garage or enclosed space, the system may include a mechanism for wirelessly signaling the garage door to open, allowing the vehicle to exit unobstructed. If the vehicle is connected to a charging station via a charging cable, the system may be configured to safely disconnect and release the charging cable before movement begins.

In response to a detected hazard, the vehicle may autonomously move to a predefined safer location or to a location outside the hazard zone that is determined dynamically based on detected hazards and environmental conditions. In some embodiments, the system may alert the user and/or first responders before initiating any relocation action, providing the user and/or first responders with an opportunity to manually override automatic relocation of the vehicle and ensuring flexibility in responding to specific circumstances.

By integrating hazard detection with autonomous vehicle movement, the system and method of this disclosure provides enhanced vehicle protection while also mitigating fire, flood, and other hazard-related damage in residential environments.

Additional aspects of this disclosure are described in greater detail below and are illustrated in the accompanying drawing figures.

BRIEF DESCRIPTION OF THE DRAWINGS

The following description and accompanying drawings illustrate various features and advantages of this disclosure. The drawings are not necessarily to scale, as emphasis is placed on illustrating the principles of the disclosure. Like reference characters may be used to indicate the same components across different figures and views. The drawings provide illustrative examples and should not be construed as limiting the scope of this disclosure.

DETAILED DESCRIPTION

The embodiments described herein are not intended to limit the invention to the precise forms disclosed, nor are they exhaustive. Rather, various embodiments are provided to facilitate understanding by those skilled in the art. The terms 'exemplary' and 'example,' as used herein, refer to instances or illustrations and should not be construed as limiting or as indicating a preferred or advantageous embodiment relative to other embodiments.

This disclosure relates to a system and method for detecting hazardous conditions such as fires, floods, earthquakes, and other emergencies through the use of sensors and instructing a vehicle to autonomously relocate to a safer location in response to detected hazards. Examples of hazardous conditions that system sensors may be configured to detect include fires; floods; earthquakes; dangerous gases including explosive, flammable, corrosive, toxic, and other gases; and extreme weather conditions such as hurricanes, tornadoes, tsunamis, and other severe storms.

The system comprises one or more sensors and/or sensor networks configured to detect hazardous conditions that may prompt vehicle relocation. A combination of onboard, local, and remote sensors may be utilized to ensure comprehensive hazard detection. Thus, the sensors and sensor networks may be installed within the vehicle, positioned externally in its immediate vicinity, or located remotely. Various types of sensors and sensor networks may be employed to detect and assess hazardous conditions. These may include, without limitation, smoke detectors; temperature sensors; light sensors; infrared sensors; moisture sensors and water leak detectors; GPS location sensors; proximity sensors for detecting objects and obstacles; vibration sensors for detecting seismic activity due to earthquakes; weather alert services that may incorporate Doppler radar and satellite imagery; public safety networks such as United States Geological Survey (USGS) monitoring networks; earthquake monitoring networks configured to utilize seismometer data to detect earthquakes and their intensity; tsunami monitoring and warning networks; and other municipal hazard detection networks.

Figure 3:
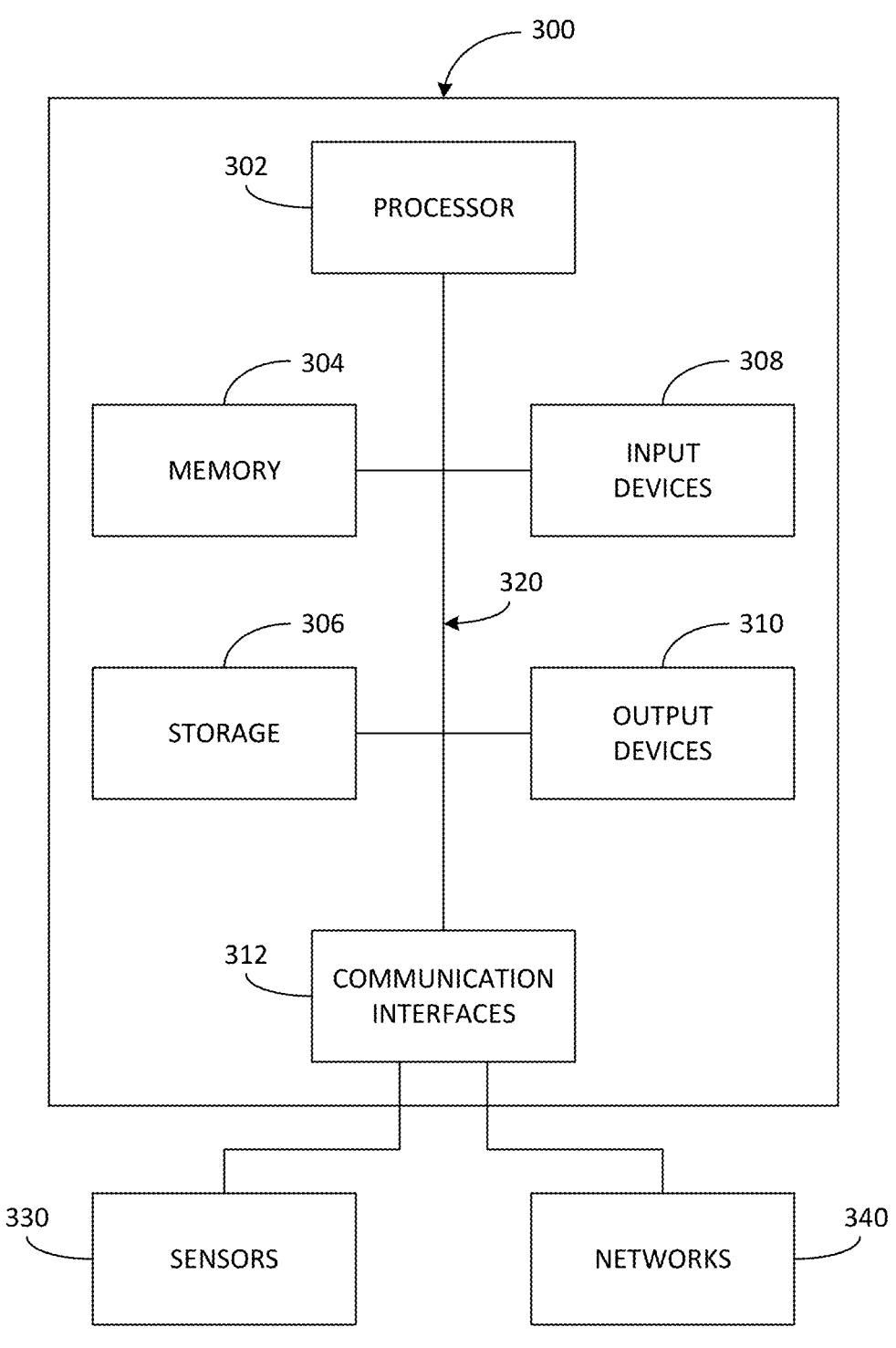
FIG. 3 is a block diagram of an exemplary computer system for implementing the system and method of this disclosure.

The sensor data is transmitted to at least one computer system for processing. An exemplary computer system 300 for implementing the system and method of this disclosure is illustrated in FIG. 3 and will be described in more detail below. The computer system may be, for example, an onboard vehicle computer system and/or an external computer system. Non-limiting examples of external computing systems include smart home hubs, computer systems located within sensor networks or within monitoring systems such as smoke detector networks, and cloud-based computing infrastructure. The computer system(s) process sensor data to identify hazardous conditions and trigger vehicle relocation when necessary.

Communication between the sensors and the computer system may be established through wireless transmission protocols such as Bluetooth, Wi-Fi, Zigbee, LoRa, cellular networks, and other proprietary protocols to allow flexible integration with various home automation and vehicle communication systems. Alternatively, sensor data may be transmitted via wired connections, including through the vehicle charging system, which can serve as both a power supply and a communication link between the vehicle and external sensors and computer systems. In some embodiments, edge computing may be employed, allowing sensor data to be processed locally within the vehicle or home hub, reducing latency and enabling faster response times. In some examples, sensor data may also be relayed to cloud-based servers for more complex processing, historical data comparison, or integration with broader emergency response systems.

When the computer system determines that a hazardous condition exists (such as a fire within the garage, for example), the computer system transmits a command instructing the vehicle to autonomously relocate to a safer location. The relocation destination may be predetermined and stored within the computer system or may be dynamically determined based on the nature and location of the detected hazard. The relocation destination may be a fixed location relative to the vehicle location (e.g., moving twenty feet backwards or exiting through the garage door to a designated location). Alternatively, an iterative approach may be employed whereby the vehicle moves an initial distance or to an initial waypoint, and then reassesses conditions to determine whether further movement to a safer location is necessary. Real-time data from public safety networks and emergency responders such as proximity to fire, floodwater, and other hazardous conditions may also be used to dynamically assess relocation routes, enabling the vehicle to optimize its path and avoid hazards that may exist beyond immediate sensor range.

Onboard vehicle parking and autonomous driving sensors are employed to ensure that autonomous vehicle movement occurs safely and to detect and avoid pedestrians, animals, structures, other vehicles, equipment such as fire hoses, and other obstacles. These sensors may include proximity sensors, ultrasonic sensors, infrared sensors, image sensors such as cameras, LiDAR, radar, and other onboard sensors, allowing the vehicle to assess its surroundings and determine whether a clear movement path exists. Moveable obstructions such as garage doors, security gates, and other barriers may prevent vehicle movement. In such cases, the computer system may wirelessly transmit an opening command to the door, gate, or other obstruction. If the obstruction cannot be opened or removed, the vehicle may attempt an alternate route to avoid the obstruction. If movement is determined to be unsafe because of an obstruction or other reasons, the vehicle remains stationary until autonomous movement can be safely carried out.

The vehicle may be configured to respond only to commands received through designated communication channels or from authorized computer systems, sensors, or sensor networks. The vehicle may also be configured to restrict its response to commands received only within a specific geographic area. This ensures that the vehicle does not inadvertently act on unauthorized signals or hazard detections from unrelated sources. For example, the vehicle may be configured to interface exclusively with the smoke detector network of a specific dwelling when it is located within a predefined region, as determined by its GPS coordinates or other geolocation data. This prevents the vehicle from responding to signals from neighboring homes, public infrastructure, or unrelated third-party monitoring systems, reducing the likelihood of erroneous vehicle movement. In some examples, the system may employ encryption or other security protocols to validate the origin and integrity of received commands. Geofencing technology may also be used to ensure that the vehicle moves autonomously only within particular geographic areas or zones, further enhancing security and preventing unintended responses.

Figure 1:
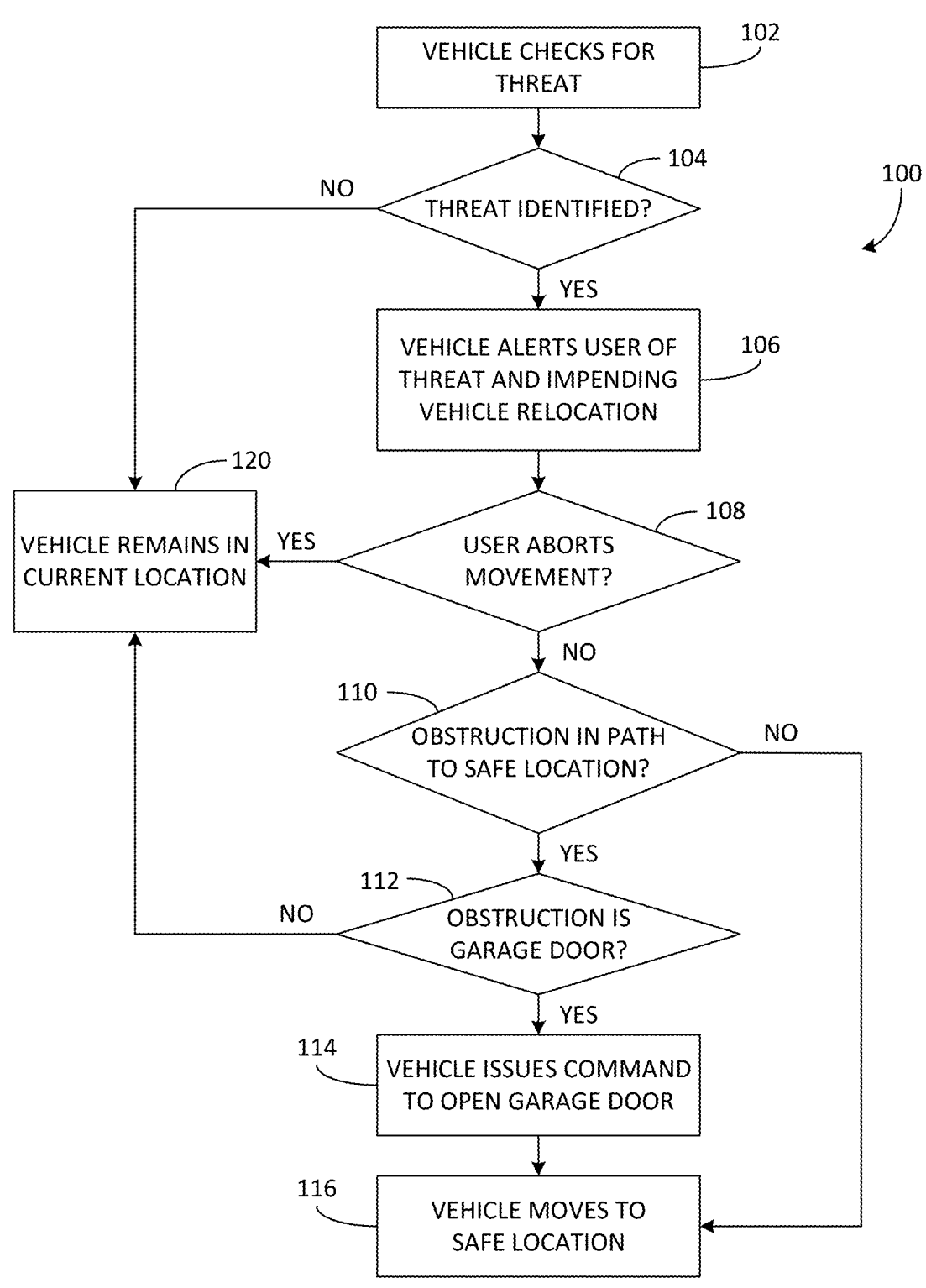
FIG. 1 is a flowchart of a method for autonomously moving a vehicle to safety in response to detected hazards, in which the vehicle onboard computer determines whether to relocate the vehicle, in accordance with aspects of this disclosure.
Figure 2:
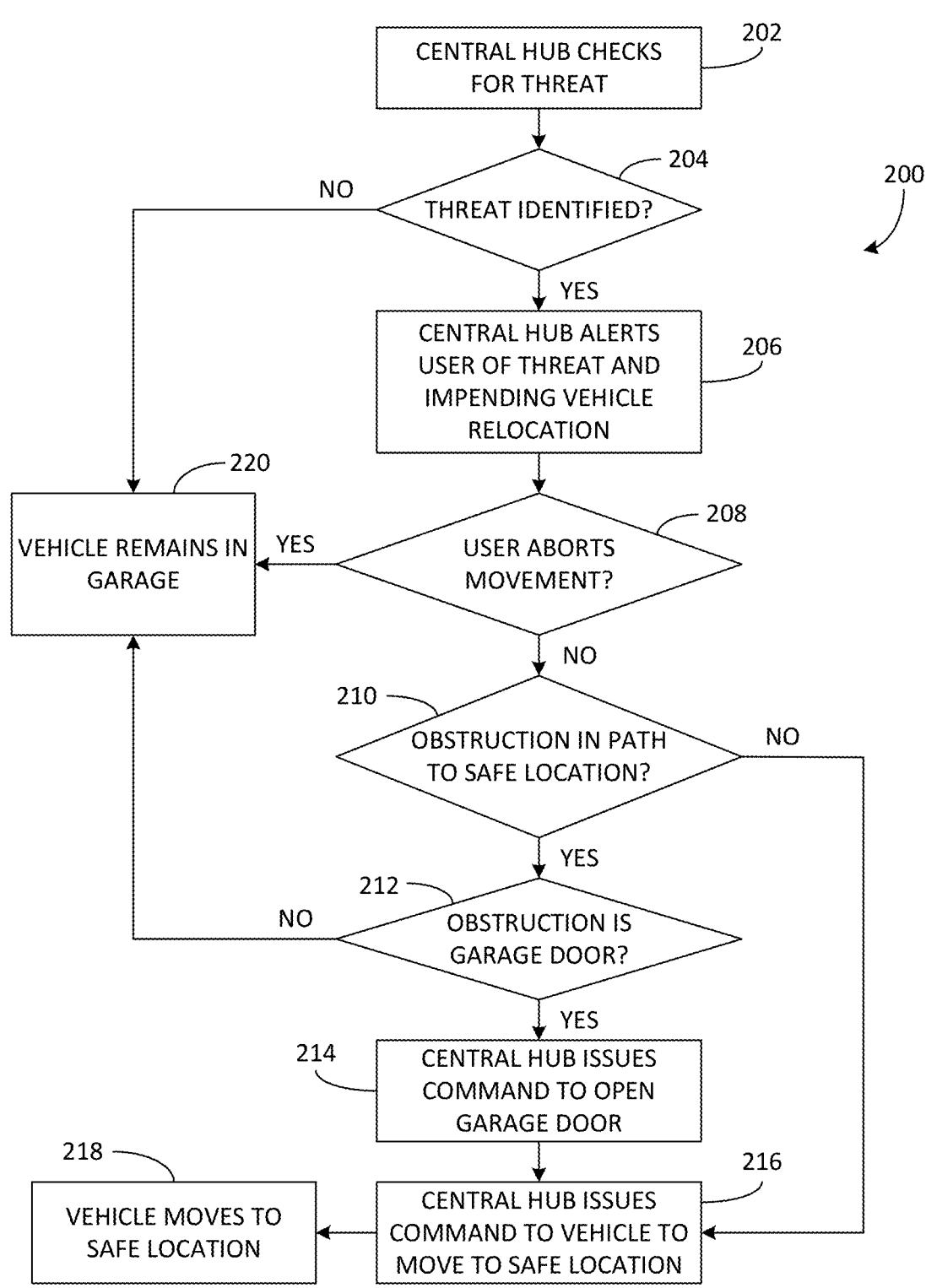
FIG. 2 is a flowchart of a method for autonomously moving a vehicle to safety in response to detected hazards, in which an external computer such determines whether to relocate the vehicle, in accordance with aspects of this disclosure.

Example operational flows for autonomously moving a vehicle to safety in response to detected hazards are illustrated in FIGS. 1 and 2. The operational flow may vary depending on whether the decision to relocate the vehicle is made by the vehicle onboard computer or by an external computer system such as a smart home hub. In the following description, the user is typically the homeowner, but may also be a tenant, another person associated with the home and/or vehicle, or emergency responders such as firefighters.

FIG. 1 is a flowchart of a method 100 for autonomously moving a vehicle to safety in response to detected hazards, in which the vehicle onboard computer system determines whether to relocate the vehicle, in accordance with aspects of this disclosure. At step 102, the vehicle onboard computer system checks for the presence of a threat or hazardous condition based on data received from onboard sensors or from trusted external sensors or sensor networks. A trusted external sensor refers to a sensor that has been verified and authenticated through a secure communication link so as to be protected against spoofing and other unauthorized interference.

At step 104, the vehicle onboard computer system evaluates the data received from onboard and external sensors and networks to evaluate the severity of any detected hazards and identify whether a threat exists. Data from sensors such as smoke detectors, temperature sensors, light sensors, infrared sensors, moisture sensors, water leak detectors, and vibration sensors, along with data from public safety networks, weather alert networks, municipal networks, and emergency responder networks, is analyzed to determine whether vehicle relocation is necessary. In evaluating the severity of detected hazards, the vehicle onboard computer may apply predefined hazard thresholds, machine learning models, and/or risk assessment algorithms to determine whether vehicle relocation is necessary. In the case of earthquake, for example, the threshold may be a certain intensity (e.g., at least 5.0 in magnitude on the Richter scale). If the vehicle onboard computer system does not identify a threat (i.e., determines that the hazard does not meet the threshold for requiring vehicle relocation; 104— NO), the vehicle remains in its current location (step 120).

In this case, operational flow may return to step 102 and continue monitoring for a hazard or threat.

As part of step 104, to prevent false alarms from unnecessarily triggering vehicle relocation, the vehicle onboard computer may implement a waiting period before confirming that a detected hazard requires vehicle relocation. During this delay, the vehicle onboard computer may continue monitoring sensor data to distinguish between transient or minor disturbances and actual emergencies. For example, the vehicle may activate external image sensors, including infrared cameras for heat detection and visible light cameras for visual confirmation of fire, flooding, and other hazards. If visual confirmation aligns with sensor data, the system may bypass the waiting period and proceed with relocation.

Once the vehicle onboard computer has identified a threat (i.e., the vehicle onboard computer determines that the hazard is sufficiently severe to require relocation; 104— YES), it may first attempt to notify the user and/or a first responder network of the detected threat and impending vehicle relocation (step 106). The alert may be provided by any suitable communication method, such as by push notifications via a user mobile application, text messages, automated phone calls, email messages, and audible alerts from smart home computer systems and devices. In some examples, the onboard vehicle computer may transmit an alert to a user mobile application providing details about the detected threat (e.g., "Smoke detected in garage at 3:15 PM" or "Floodwaters rising near driveway") and the intended relocation action (e.g., "Vehicle is preparing to move to designated safe location"). An alert notification may also be provided by the vehicle itself, such as by honking the vehicle horn, activating the vehicle alarm system, flashing the vehicle lights, etc. In some examples, when the vehicle onboard computer has detected a threat, it may also alert other sensors and sensor networks of the threat. For example, the vehicle onboard computer may alert the smoke detector network of a fire by wireless communication with the smoke detector network or auxiliary hardware associated with the smoke detector network.

The user or first responders on the scene may be provided in step 108 with an override option to abort vehicle relocation if deemed unnecessary or unsafe. The override option may be implemented, for example, by a prompt in a user mobile application, home computer system, or smart home hub, or by first responder command, allowing emergency personnel to abort vehicle movement if it is unsafe or interferes with ongoing operations. Examples of first responder abort actions include (without limitation) a signal or command sent by the first responder to all systems within a predetermined distance; a signal or command sent by the first responder to a cloud-based or other remote system that includes location information such as GPS coordinates of the first responder; or a system interface such as a pad in an accessible location such as the exterior of the house that warns of impending vehicle relocation action and offers an override or abort option such as a button. If an override or abort command is received by the onboard vehicle computer system within a predetermined timeframe (108—YES), then vehicle relocation is aborted and the vehicle remains in its current location (step 120).

If no override or abort command is received within a predetermined timeframe (108—NO), or if the user explicitly confirms that relocation should proceed, operational flow proceeds to step 110 to determine whether any obstructions are present in the vehicle movement path. That is, the vehicle onboard computer system evaluates whether a predetermined or dynamically determined safe location can be reached without obstruction. In step 110, the vehicle onboard computer system analyzes data from proximity sensors, parking sensors, LiDAR, radar, image sensors such as cameras, ultrasonic sensors, infrared sensors, and other obstacle detection sensors to detect obstructions such as closed garage doors or gates, pedestrians, animals, vehicles, first responders, debris, fire hoses, and other emergency equipment.

If no obstructions are detected in the vehicle path to a safe location (110—NO), the vehicle onboard computer system initiates autonomous relocation of the vehicle to the designated safe location (step 116). In some embodiments, if the vehicle is connected to a charging station, the onboard computer initiates a charging disconnect sequence before vehicle movement is initiated. This may involve stopping active charging to safely disengage from the power source, unlatching or unlocking the charging port to enable charging cable removal, and automatic ejection of the charging cable (if supported by the charging system). The vehicle then begins movement and autonomously navigates along the route to the safe location while continuously monitoring for new obstacles or environmental hazards during movement.

If obstructions are detected in the vehicle path (110—YES), the vehicle onboard computer system makes a determination in step 112 as to whether the obstruction is a closed garage door, security gate, or other barrier that can be remotely opened to clear the path. This may be done, for example, by analysis of data from vehicle parking and proximity sensors, or by receiving the state of the door or gate (opened or closed) from a door or gate controller. If the detected obstruction is a remotely operable door or gate (112—YES), the vehicle onboard computer issues a wireless control command to the garage door or gate controller to open the door or gate (step 114). The open command may be sent, for example, to a smart garage door opener or to auxiliary hardware connected to the garage door opener, and may be sent directly to the opener or via an external computer such as a smart home hub. Alternatively, many vehicles are equipped themselves with HomeLink systems or the like to open garage doors wirelessly. Once the door or gate has been opened, autonomous movement of the vehicle to the safe location proceeds (step 116).

Once the vehicle has exited the garage or gated area, the vehicle onboard computer system may then issue a wireless control command to the garage door or gate controller to close the garage door or gate. In the event that the vehicle encounters an obstacle after the garage door or gate is opened but before the vehicle is able to exit the garage, the vehicle onboard computer will issue a wireless control command to the garage door or gate controller to close the garage door or gate. In this scenario, if the vehicle has partially exited the garage when it encounters the obstacle and is in the movement path of the garage door or gate, the vehicle onboard computer will instruct the vehicle to return completely into the garage and out of the door or gate path before instructing the garage door or gate to close.

If the detected obstruction is not a garage door, gate, or other barrier that can be remotely instructed to open-such as another vehicle, pedestrian, fire hose, or debris-the vehicle onboard computer system determines that it is unsafe to proceed (112—NO). In this case, the vehicle remains stationary at its current location (step 120). The vehicle onboard computer may continue monitoring the obstruction and reassessing conditions at regular intervals to determine if safe movement becomes possible at a later time.

FIG. 2 is a flowchart of a method 200 for autonomously moving a vehicle to safety in response to detected hazards, in which a computer system external to the vehicle determines whether to relocate the vehicle, in accordance with aspects of this disclosure. In some examples, the external computer system is a smart home hub such as Apple Home, Amazon Alexa, Google Nest, etc. Method 200 is very similar to method 100 in most aspects and, unless stated otherwise, operates in generally the same fashion as method 100.

At step 202, the external computer system checks for the presence of a threat or hazardous condition based on data received from trusted home or external sensors or sensor networks and from onboard vehicle sensors. At step 204, the external computer system evaluates data received from home and vehicle sensors and sensor networks to evaluate the severity of any detected hazards and identify whether a threat exists. In evaluating the severity of detected hazards, the external computer may apply predefined hazard thresholds, machine learning models, and/or risk assessment algorithms. If the external computer determines that no immediate threat is present (204—NO), the vehicle remains in its current location (step 220). As in method 100 implemented by the vehicle onboard computer, the external computer may implement a waiting period before confirming that a detected hazard requires vehicle relocation.

Once the external computer has identified a threat by determining that a hazard meets or exceeds the predefined threshold for vehicle relocation (204—YES), it may first attempt to alert the user and/or a first responder network about the detected threat and the impending vehicle relocation (step 206). As in method 100, the alert may be sent to the user by communication methods such as push notifications via a user mobile application, text messages, automated phone calls, email messages, and audible alerts from smart home computer systems and devices. The external computer system may also instruct the vehicle onboard computer to provide audio and visual alerts such as horn honking and light flashing, and may alert other sensors and sensor networks of the threat.

The user or first responders on the scene may be provided in step 208 with an override option to abort vehicle relocation if deemed unnecessary or unsafe. The override option may be implemented, for example, by a prompt in a user mobile application, home computer system, or smart home hub, or by first responder command, allowing emergency personnel to abort vehicle movement if it is unsafe or interferes with ongoing operations. Examples of first responder abort actions include (without limitation) a signal or command sent by the first responder to all systems within a predetermined distance; a signal or command sent by the first responder to a cloud-based or other remote system that includes location information such as GPS coordinates of the first responder; or a system interface such as a pad in an accessible location such as the exterior of the house that warns of impending vehicle relocation action and offers an override or abort option such as a button. If an override or abort command is received by the onboard vehicle computer system within a predetermined timeframe (208—YES), then vehicle relocation is aborted and the vehicle remains in its current location (step 220).

If no override or abort command is received within a predetermined timeframe (208—NO), or if the user explicitly confirms that relocation should proceed, operational flow proceeds to step 210 in which the external computer communicates with onboard vehicle sensors (e.g., proximity sensors, parking sensors, LiDAR, radar, image sensors such as cameras, ultrasonic sensors, infrared sensors) and/or the onboard vehicle computer to determine whether any obstructions (e.g., closed garage doors or gates, pedestrians, animals, vehicles, first responders, debris, fire hoses) are present in the intended vehicle movement path.

If no obstructions are detected in the vehicle path to a safe location (210—NO), the external computer system issues a command to the onboard vehicle computer to initiate autonomous movement of the vehicle to a designated safe location (step 216), and the vehicle moves to the safe location (step 218). If the vehicle is connected to a charging station, the vehicle onboard computer initiates a charging disconnect sequence before vehicle movement is initiated. This may involve stopping active charging to safely disengage from the power source, unlatching or unlocking the charging port to enable charging cable removal, and automatic ejection of the charging cable (if supported by the charging system).

If obstructions are detected in the vehicle path (210—YES), the external computer communicates in step 212 with the vehicle sensors and/or vehicle onboard computer system to make a determination as to whether the obstruction is a closed garage door or security gate that can be remotely opened to clear the path. This may be done, for example, by analysis of data from vehicle parking and proximity sensors, or by receiving the state of the door or gate (opened or closed) from the door or gate controller. If the detected obstruction is a remotely operable door or gate (212—YES), the external computer issues a wireless control command to the garage door or gate controller directly or via the vehicle onboard computer to open the door or gate (step 214). Once the door or gate has been opened, the external computer system issues a command to the onboard vehicle computer to initiate autonomous movement of the vehicle to the designated safe location (step 216), and the vehicle moves to the safe location (step 218).

Once the vehicle has exited the garage or gated area, the external computer system may then issue a wireless control command to the garage door or gate controller to close the garage door or gate. In the event that the vehicle encounters an obstacle after the garage door or gate is opened but before the vehicle is able to exit the garage, the external computer will issue a wireless control command to the garage door or gate controller to close the garage door or gate. In this scenario, if the vehicle has partially exited the garage when it encounters the obstacle and is in the movement path of the garage door or gate, the external computer will instruct the vehicle to return completely into the garage and out of the door or gate path before instructing the garage door or gate to close.

If the detected obstruction is not a garage door, gate, or other barrier that can be remotely instructed to open, the external computer system determines that it is unsafe to proceed (212—NO). In this case, the vehicle remains stationary at its current location (step 220). The external computer may continue monitoring the obstruction and reassessing conditions at regular intervals to determine if safe movement becomes possible at a later time.

FIG. 3 is a block diagram of an exemplary computer system 300 for implementing the system and method of this disclosure, in particular, for implementing method 100 of FIG. 1 or method 200 of FIG. 2. Computer system 300 may be implemented as the vehicle onboard computer system or as an external computer system (e.g., a smart home hub) responsible for monitoring environmental hazards, making vehicle relocation decisions, and issuing movement commands to the vehicle. Computer system 300 comprises processor 302, memory 304, storage 306, input devices 308, output devices 310, and communication interfaces 312, all interconnected via system bus 320 or another suitable interconnection architecture.

Processor 302 executes instructions stored in memory 304 to carry out operations associated with methods 100 and 200, including analyzing data from sensors 330 and networks 340, determining whether a hazardous condition exists, assessing whether vehicle relocation is necessary, and issuing appropriate control commands. Depending on whether computer system 300 is onboard the vehicle or external to the vehicle, processor 302 either directly controls vehicle movement (method 100) or communicates with the vehicle onboard computer system to issue movement commands (method 200). Processor 302 may comprise various types of computing units, including a central processing unit (CPU), microcontroller, digital signal processor (DSP), application-specific integrated circuit (ASIC), or field-programmable gate array (FPGA), allowing for real-time hazard assessment and autonomous movement decisions.

Memory 304 stores software instructions and decision-making algorithms that allow processor 302 to execute the steps of methods 100 and 200. For example, predetermined hazard thresholds, machine learning models, and risk assessment algorithms may be stored in memory 304 to process sensor data and determine whether vehicle relocation is necessary. Memory 304 may comprise volatile memory (e.g., RAM) for real-time processing and non-volatile memory (e.g., flash storage or ROM) for retaining information such as system configurations and user preferences.

Storage 306 provides long-term data retention and may include hard disk drives (HDDs), solid-state drives (SSDs), optical storage devices, cloud-based storage, and network-attached storage (NAS). Storage 306 maintains operating system files, software applications, and persistent data related to aspects of this disclosure.

Computer system 300 may comprise one or more input devices 308, such as a keyboard, a mouse, a touchscreen, a stylus, a microphone, or other human interface devices. Input devices 308 enable user interaction and data entry. Computer system 300 may further comprise one or more output devices 310, such as a display screen, a printer, a speaker, or haptic feedback devices. Output devices 310 allow computer system 300 to present information to a user or interact with external environments.

Computer system 300 further comprises one or more communication interfaces 312 that enable wired or wireless communication with external systems, such as sensors 330 and networks 340. Communication interfaces 312 may comprise, for example, network interface cards (NICs), Wi-Fi modules, Bluetooth transceivers, Universal Serial Bus (USB) ports, and other suitable communication components. Computer system 300 may communicate over local area networks (LANs), wide area networks (WANs), or the Internet.

System bus 320 interconnects processor 302, memory 304, storage 306, input/output devices 308 and 310, and communication interfaces 312, facilitating data transfer between these components. System bus 320 may comprise a combination of address, data, and control buses.

Computer system 300 receives environmental sensor data via communication interfaces 312 from sensors 330, which may be installed onboard the vehicle, externally around the home and garage, or integrated into remote hazard monitoring networks. Sensors 330 may include, for example, smoke detectors, temperature sensors, light sensors, infrared sensors, moisture sensors and water leak detectors, vibration sensors, proximity sensors, LiDAR, radar, ultrasonic sensors, and GPS location sensors. Computer system 300 may also receive environmental data via communication interfaces 312 from networks 340 such as weather alert services, public safety networks, earthquake monitoring networks, tsunami monitoring and warning networks, and other municipal hazard detection networks. Data from sensors 330 and networks 340 is processed by processor 302, which determines whether threat severity thresholds have been met and initiates appropriate vehicle relocation actions.

Computer system 300 operates under the control of an operating system (OS), which manages hardware resources and provides an execution environment for application software. The OS may be a general-purpose system such as Microsoft Windows, macOS, Linux, or a specialized embedded system. The OS resides in storage 306 and is loaded into memory 304 upon startup, where it runs on processor 302.

While certain embodiments are described herein, they are provided by way of example only and do not limit the scope of this disclosure. Various modifications, substitutions and omissions may be made without departing from the spirit and scope of the invention. The methods and processes described herein are not limited to any particular sequence and may be used independently or in combination. Steps may be omitted, reordered, or added in different implementations. No aspect of this description should be interpreted as requiring any specific feature, component, or step as essential or indispensable. Many variations, modifications, and enhancements are possible, all of which fall within the scope of the invention as defined by the following claims.

The invention claimed is:

1. A method for autonomously relocating a vehicle in response to a detected hazard, comprising:
   receiving sensor data from one or more sensors configured to detect hazardous conditions;
   analyzing the sensor data to determine whether a hazardous condition exists;
   if it is determined that the hazardous condition exists, issuing a relocation command to the vehicle to autonomously move along a movement path to another location; and
   if a door or gate that can be remotely opened is present in the movement path, issuing an open command to open the door or gate before issuing the relocation command to the vehicle.

2. The method of claim 1, further comprising determining whether any obstructions are present in the movement path before issuing the relocation command.

3. The method of claim 2, wherein the movement path is predetermined.

4. The method of claim 1, further comprising issuing a close command to close the door or gate after the vehicle has cleared the door or gate.

5. A system for autonomously relocating a vehicle in response to a detected hazard, comprising:
   a processor configured to execute instructions;
   a memory storing executable instructions that, when executed by the processor, cause the processor to:
      receive sensor data from one or more sensors configured to detect hazardous conditions;
      analyze the sensor data to determine whether a hazardous condition exists;
      if it is determined that the hazardous condition exists, issue a relocation command to the vehicle to autonomously move along a movement path to another location; and if a door or gate that can be remotely opened is present in the movement path, issue an open command to open the door or gate before issuing the relocation command to the vehicle.

6. The method of claim 1, further comprising transmitting an alert indicating the detected hazardous condition and an intended relocation action.

7. The method of claim 6, further comprising aborting relocation of the vehicle when an override command is received in response to the alert within a predetermined time.

8. The method of claim 6, wherein the alert comprises a push notification, text message, automated phone call, email message, or an audible alert.

9. The method of claim 1, further comprising issuing an alert from the vehicle when it is determined that the hazardous condition exists.

10. The method of claim 9, wherein the alert comprises honking the vehicle horn, activating the vehicle alarm system, or flashing the vehicle lights.

11. The method of claim 1, further comprising disconnecting the vehicle from a charging station before initiating vehicle movement.

12. The method of claim 1, wherein the hazardous condition is a fire, flood, earthquake, tornado, hurricane, or tsunami.

13. A method for autonomously relocating a vehicle in response to a detected hazard, comprising:
   receiving smoke detector data from a smoke detector of a dwelling;
   analyzing the smoke detector data to determine whether a fire exists; and
   if it is determined that the fire exists, issuing a relocation command to the vehicle to autonomously move along a movement path to another location.

14. The method of claim 13, further comprising receiving data from at least one of weather alert services, public safety networks, and municipal hazard detection networks.

15. The system of claim 5, wherein the processor is further configured to issue a command to close the door or gate after the vehicle has cleared the door or gate.

16. The system of claim 5, wherein the processor is further configured to determine whether any obstructions are present in the movement path before issuing the relocation command.

17. The system of claim 5, wherein the processor is further configured to transmit an alert indicating the detected hazardous condition and an intended relocation action.

18. The system of claim 17, wherein the processor is further configured to abort relocation of the vehicle when an override command is received in response to the alert within a predetermined time.

19. The system of claim 5, wherein the processor is further configured to:
   receive smoke detector data from a smoke detector of a dwelling;
   analyze the smoke detector data to determine whether a fire exists; and
   if it is determined that the fire exists, issue the relocation command to the vehicle.

* * * * *